(12) United States Patent
Hollander

(10) Patent No.: US 11,300,941 B1
(45) Date of Patent: *Apr. 12, 2022

(54) METHODS FOR GENERATING NUMERICAL CONTROL PROGRAMS FOR AUTOMATED MANUFACTURING SYSTEMS WITH MULTIPLE INDEPENDENT TOOLHEADS

(71) Applicant: Jonathan Worthy Hollander, San Francisco, CA (US)

(72) Inventor: Jonathan Worthy Hollander, San Francisco, CA (US)

( * ) Notice: Subject to any disclaimer, the term of this patent is extended or adjusted under 35 U.S.C. 154(b) by 116 days.

This patent is subject to a terminal disclaimer.

(21) Appl. No.: 16/827,486

(22) Filed: Mar. 23, 2020

Related U.S. Application Data

(63) Continuation of application No. 16/102,342, filed on Aug. 13, 2018, now Pat. No. 10,635,076, which is a continuation of application No. 14/809,275, filed on Jul. 26, 2015, now Pat. No. 10,073,434.

(60) Provisional application No. 62/029,267, filed on Jul. 25, 2014.

(51) Int. Cl.
| | |
|---|---|
| G05B 19/00 | (2006.01) |
| G05B 19/31 | (2006.01) |
| G05B 19/402 | (2006.01) |
| B33Y 10/00 | (2015.01) |
| B33Y 50/02 | (2015.01) |
| B33Y 30/00 | (2015.01) |

(52) U.S. Cl.
CPC ............ *G05B 19/31* (2013.01); *G05B 19/402* (2013.01); *B33Y 10/00* (2014.12); *B33Y 30/00* (2014.12); *B33Y 50/02* (2014.12); *G05B 2219/50131* (2013.01)

(58) Field of Classification Search
None
See application file for complete search history.

(56) References Cited

U.S. PATENT DOCUMENTS

| | | | |
|---|---|---|---|
| 5,561,742 A | 10/1996 | Terada | |
| 6,419,563 B1 | 7/2002 | Ido | |
| 8,818,558 B2 | 8/2014 | Cassano | |
| 10,635,076 B1* | 4/2020 | Hollander | ............... G05B 19/31 |
| 2007/0150093 A1 | 6/2007 | Nagatsuka | |
| 2011/0066282 A1 | 3/2011 | Bosscher | |
| 2015/0165690 A1* | 6/2015 | Tow | ....................... B29C 64/118 |
| | | | 700/119 |
| 2016/0052057 A1* | 2/2016 | Xu | ...................... B23K 15/0086 |
| | | | 419/5 |

* cited by examiner

*Primary Examiner* — Paul B Yanchus, III
(74) *Attorney, Agent, or Firm* — Trellis IP Law Group, PC

(57) ABSTRACT

An automated manufacturing system includes two simultaneous and independently operating toolheads accessing any location within the same work volume, with the exception of locations in proximity to each other. The system includes a bed platform connected with X and Y linear axes. A θ rotational axis rotates the bed and its linear axes as a unit. A first toolhead has a fixed position relative to the θ axis, and a second toolhead is coupled with a linear R axis parallel to the bed. The bed X and Y axes move the bed relative to the first toolhead, enabling the first toolhead to reach any portion of the bed. The R linear axis and θ rotational axis allow the second toolhead to move almost anywhere in a circular area that is always centered near the first toolhead. The system's kinematics ensure that it is impossible for the toolheads to collide.

17 Claims, 12 Drawing Sheets

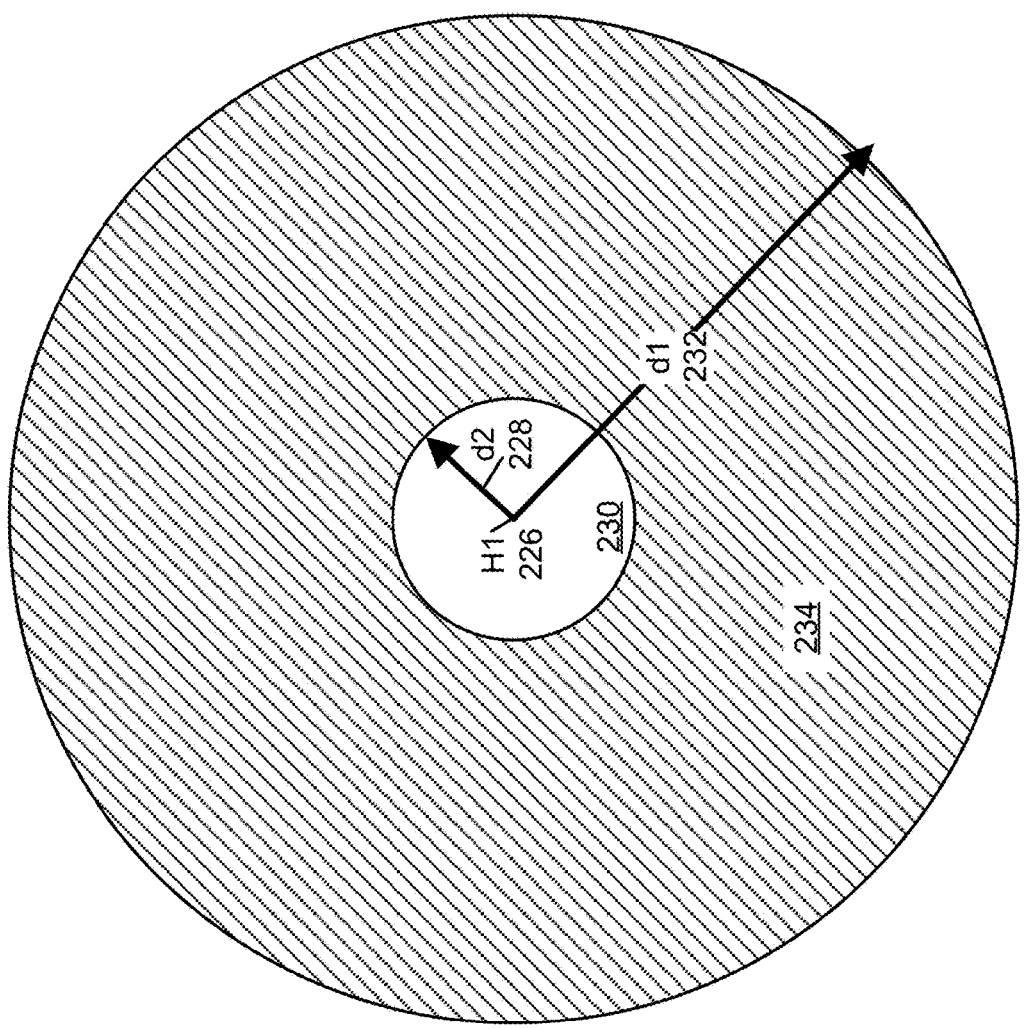

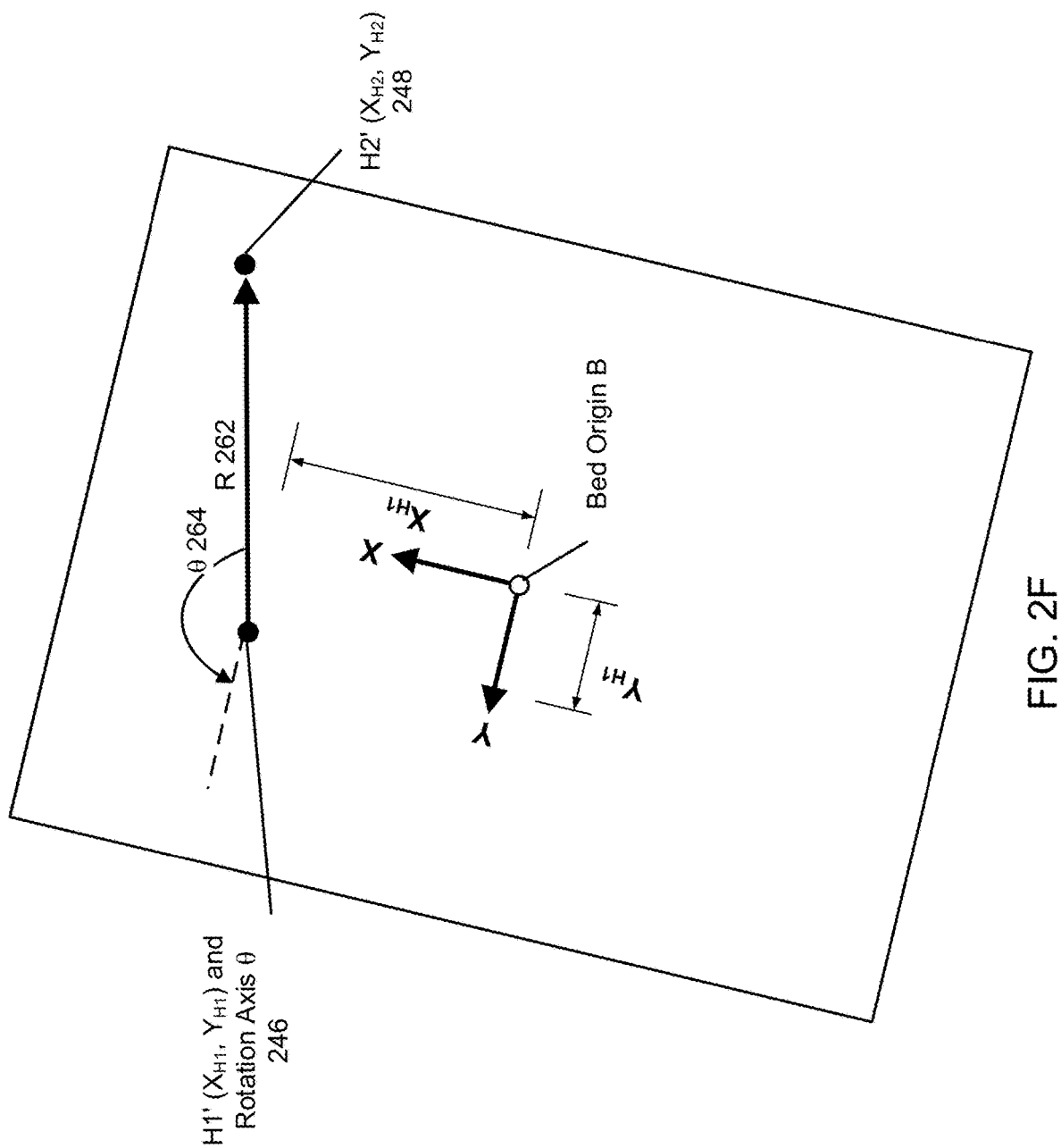

METHODS FOR GENERATING NUMERICAL CONTROL PROGRAMS FOR AUTOMATED MANUFACTURING SYSTEMS WITH MULTIPLE INDEPENDENT TOOLHEADS

CROSS REFERENCES TO RELATED APPLICATIONS

This application is a continuation of the following application, U.S. patent application Ser. No. 16/102,342, entitled METHODS FOR GENERATING NUMERICAL CONTROL PROGRAMS FOR AUTOMATED MANUFACTURING SYSTEMS WITH MULTIPLE INDEPENDENT TOOLHEADS, filed on Aug. 13, 2018, which is a continuation of U.S. Pat. No. 10,073,434, issued on Sep. 11, 2018, which claims priority from U.S. Provisional Patent Application Ser. No. 62/029,267, entitled Jul. 25, 2014, filed on MANUFACTURING SYSTEMS AND METHODS WITH MULTIPLE INDEPENDENT TOOLHEADS, which are hereby incorporated by reference, as if set forth in full in this specification.

REFERENCE TO COMPUTER PROGRAM LISTING APPENDIX

This application is submitted with a computer program listing appendix including one file entitled "BB_Sim_3.txt" created Jul. 22, 2014, (23,762 Bytes), and is incorporated by reference herein for all purposes.

BACKGROUND OF THE INVENTION

The present invention relates to the field of automated manufacturing systems and methods of controlling the same. Automated manufacturing systems are capable of manufacturing parts with complicated geometry from a variety of materials. Automated manufacturing systems include subtractive manufacturing systems, which create parts by removing material, such as computer-numerical control (CNC) mills, and additive manufacturing systems, which create parts by depositing material, such as 3D printing and automated composite layup systems like filament winding, automated fiber placement, and automated tape laying systems.

Most automated manufacturing systems include a toolhead, which subtracts, cuts, or adds material in the work area, mounted to a motion gantry that moves the toolhead relative to the work area. The motion gantry may move the toolhead itself and/or a work table or part relative to the toolhead. The motion gantry may include linear, rotary, or other motion axes, and many automated manufacturing systems are capable of moving toolheads relative to the work area in at least three linear dimensions to position the toolhead anywhere in three-dimensional space inside the work area. Additional motion axes may be included to change the angle of the toolhead relative to the part, either by rotating the toolhead or the part. Motion gantries may include any number of linear and/or rotary actuators connected in series or parallel to the toolhead, bed platform or other part fixturing device, and/or the part itself.

However, there is an unmet need for efficient and robust automated manufacturing systems capable of operating two or more toolheads simultaneously and independently over the same work area. Operating multiple toolheads simultaneously allows for faster and versatile manufacturing. For example, two simultaneous toolheads can add or subtract material on different portions of the same part, performing different operations (e.g. milling and drilling) or similar operations (e.g. both toolheads milling).

Crashing is one problem in automated manufacturing systems. A crash occurs when the system moves in such a way that is harmful to the system, toolhead or tools, or parts being manufactured. A crash can occur when the toolhead or part collides unexpectedly with the part being manufactured or with another part of the machine. Software simulations and sensors, such as limit switches or closed-loop control systems, have greatly reduced the occurrence of crashes in automated manufacturing systems with a single toolhead.

Unfortunately, it is still very difficult to prevent crashing in automated manufacturing systems with two or more toolheads simultaneously and independently operating over the same work area. Not only does the system need to ensure that each toolhead is not trying to access the same position or nearby positions at the same time, but the system much ensure that each toolhead's associated motion gantry does not interfere with the other toolhead or its motion gantry. For this reason, most automated manufacturing systems with multiple simultaneously operating toolheads limit each toolhead to a fixed portion of the work area or attach multiple toolheads to the same motion gantry at a fixed offset. The former solution is inflexible and is only useful when the part size and manufacturing time is equally distributed over the partitioning of the work area, otherwise one or more of the toolheads will be idle for a long period of time. The latter solution cannot move toolheads independently of each other; this is only useful for creating multiple copies of the same part simultaneously, but provides no benefit when making a single part.

BRIEF DESCRIPTION OF THE DRAWINGS

The invention will be described with reference to the drawings, in which:

FIGS. 2A-2F illustrate the coordinate transformations from toolhead positions to machine axes and motion ranges of the toolhead in an automated manufacturing system according to an embodiment of the invention;

SUMMARY

Figure 1A:
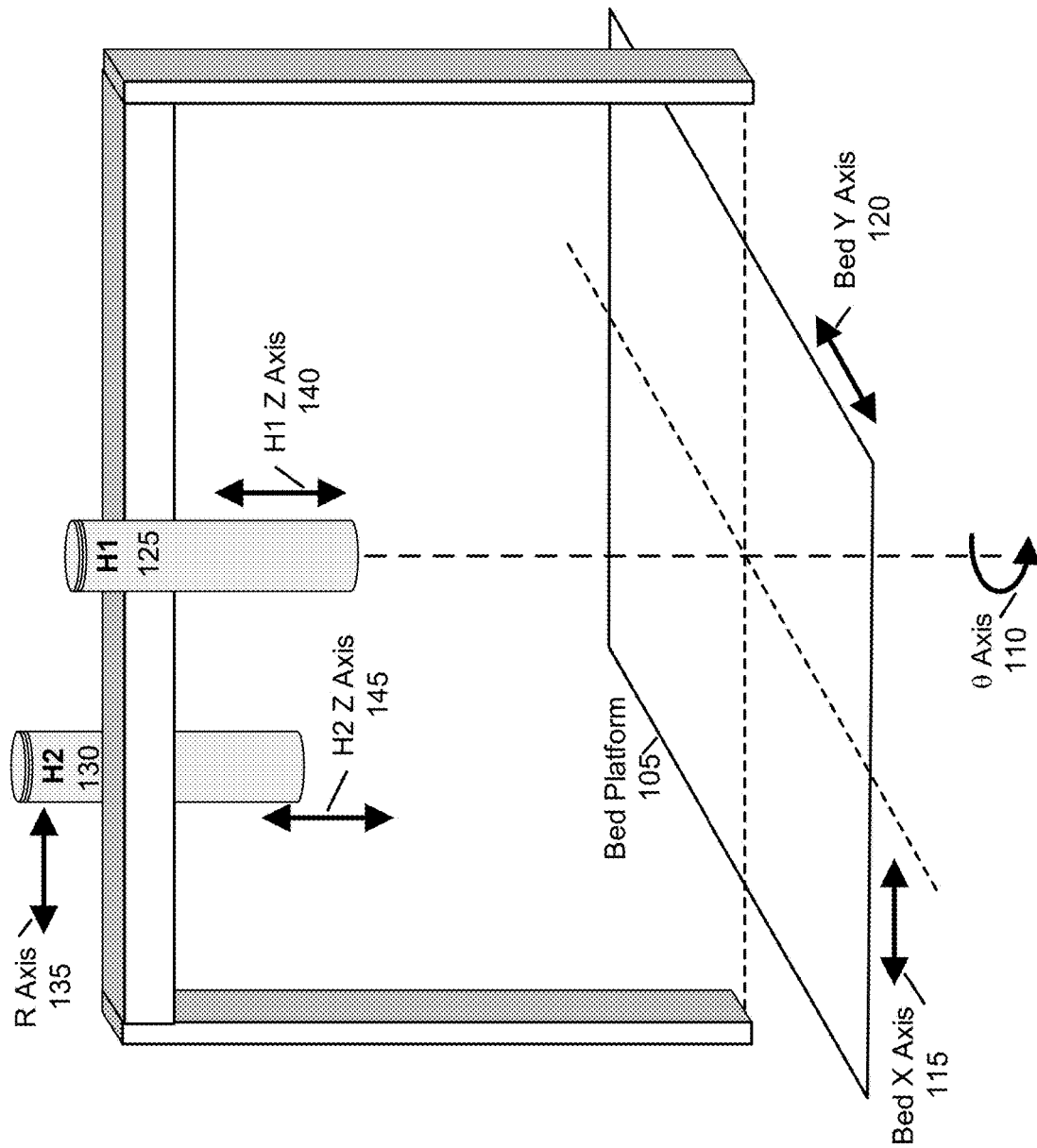
FIGS. 1A-1B illustrates an automated manufacturing system including two independently and simultaneously operating toolheads according an embodiment of the invention.

Embodiments of the invention include an automated manufacturing system including two simultaneous and independently operating toolheads. Each toolhead can access any location within the same work volume independently of the other toolhead, with the exception of locations in close proximity to the other toolhead. Unlike prior automated manufacturing systems, the mechanical design and kinematics of embodiments of the invention ensure that it is physically impossible for the toolheads to collide or physically contact each other. Furthermore, control methods of the automated manufacturing system are readily adaptable to current tool path creation techniques and do not require any three-dimensional simulation or collision detection calculations to ensure non-interference between toolheads.

An embodiment of the invention includes a bed platform connected with X and Y linear motion axes. The bed platform and bed X and Y motion axes are further connected with rotational platform defining a θ rotational axis, so that the bed and its bed X and Y linear axes can be rotated as a unit around the θ axis.

An embodiment of the invention includes a first toolhead mounted above the bed platform at a fixed position with respective to the θ axis (with the exception of optional toolhead motion parallel to the θ axis). In a further embodiment, the first toolhead is centered on the θ rotational axis, such that rotating the bed platform around the θ axis does not change the relative position of the first toolhead.

An embodiment of the invention also includes a second toolhead coupled with a linear R axis parallel to the bed platform. In a further embodiment, the linear R axis is offset from the first toolhead by at least the minimum clearance required between the first and second toolheads. This makes it impossible for the first and second toolheads to collide.

The combination of these four motion axes (the linear axes bed X, bed Y, and R, and the rotational θ axis) are sufficient to simultaneously and independently position both toolheads anywhere within the area of the bed platform. The bed X and bed Y axes move the bed platform relative to the first toolhead, enabling the first toolhead to reach any portion of the bed platform. The R linear axis and θ rotational axis allow the second toolhead to move anywhere in a circular area centered around the first toolhead, with the exception of a small region near the first toolhead. Because the second toolhead's work area is centered around the first toolhead, the second toolhead's allowable work area follows the first toolhead as it moves relative to the bed platform, allowing the second toolhead to eventually access any position in the bed platform area. Furthermore, because the second toolhead only moves relative to the first toolhead along a single linear axis (R), it is impossible for the first and second toolheads to collide.

DETAILED DESCRIPTION

Embodiments of the invention include an automated manufacturing system including two simultaneous and independently operating toolheads. Each toolhead can access any location within the same work volume independently of the other toolhead, with the exception of locations in close proximity to the other toolhead. Unlike prior automated manufacturing systems, the mechanical design and kinematics of embodiments of the invention ensure that it is physically impossible for the toolheads to collide or physically contact each other. Furthermore, control methods of the automated manufacturing system are readily adaptable to current tool path creation techniques and do not require any three-dimensional simulation or collision detection calculations to ensure non-interference between toolheads.

FIG. 1A illustrates an automated manufacturing system 100 including two independently and simultaneously operating toolheads according to an embodiment of the invention. The automated manufacturing system 100 includes a bed platform 105 or other workholding or fixturing system for supporting the part during manufacturing. The bed platform 105 is connected to a rotary actuator defining a θ axis of rotation 110 and a pair of linear actuators defining bed X and Y motion axes 115 and 120. These linear and rotary actuators allow the bed platform 105 to translate along the bed X and bed Y motion axes 115 and 120, and rotate around the θ axis 110. As shown in FIG. 1A, an embodiment of the θ rotation axis 110 may be orthogonal to the bed motion axes 115 and 120.

In an embodiment, the bed X and Y linear motion axes 115 and 120 are mounted to the rotating θ motion axis 110, such the θ axis 110 stays in a fixed position relative to the system 100 and the bed platform and bed X and Y 115 and 120 motion axes are rotated as a unit around the θ axis of rotation. This enables the bed platform 105 to translate along the bed X and Y motion axes 115 and 120, regardless of the angular position of the θ rotation axis 110 and the bed X and Y motion axes' 115 and 120 orientation with relative to the rest of the system 100.

Figure 1B:
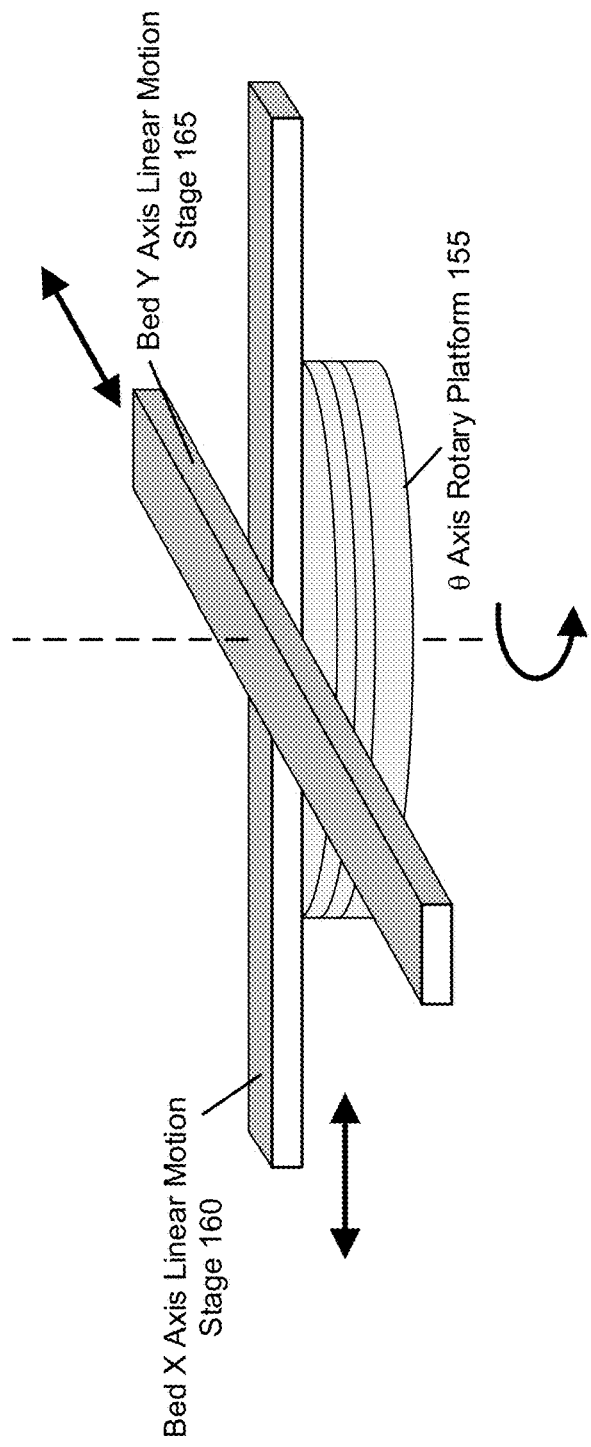

An example 150 of this is illustrated in FIG. 1B. This example 150 mounts a bed X axis linear motion stage 160 to a rotary platform 155. This example also mounts a bed Y axis linear motion stage 165 to the bed X axis linear motion stage 160. The bed platform is then mounted to the bed Y axis linear motion stage 165. In this example, the bed Y axis linear motion stage 165 can move the bed platform along the bed Y axis, the bed X linear motion stage 160 can move the bed Y linear motion stage 165 and bed platform along the bed X axis, and the rotary platform 155 can rotate the bed platform, bed X linear motion stage 160, and bed Y linear motion stage 165 as a unit around the θ rotation axis.

Returning to the embodiment shown in FIG. 1A, the automated manufacturing system 100 includes a pair of toolheads, H1 125 and H2 130. Toolheads H1 125 and H2 130 may include any type and permutation of additive and/or subtractive manufacturing tools. Example subtractive manufacturing tools that can be mounted to toolhead H1 125 and/or H2 130 include mills, routers, lathes, drills, turning tools, surface and cylindrical grinders, plasma cutters, electro-discharge machining (EDM) tools, laser cutters, water jet cutters, and other machine tools. Example additive manufacturing tools that can be mounted to toolhead H1 125 and/or H2 130 include 3D printing, robotic welding, and automated composite layup systems like filament winding, automated fiber placement, and automated tape laying systems. 3D printing is used herein to generally refer any process that creates three-dimensional parts using at least an additive process to deposit and bond successive layers of material and includes extrusion-based process, such as fused deposition modeling; wire-based or rod-based processes, such as electron beam freeform fabrication; granular or powder-based processes, such as direct metal laser sintering, electron-beam melting, selective laser sintering or melting, selective heat sintering; jetting-based systems that selectively deposit glues, binders, solvents, metals, plastics, gels, photopolymers, or other materials; laminated object manufacturing systems; and stereolithography, selective electroforming, or other systems based selectively hardening, softening, curing, chemically reacting or inhibiting, removing, or depositing material in areas where energy is directed. Additional toolhead mechanisms, such as automated tool changers or material feed changers, may be included in the system to change the properties, capabilities, and/or output materials of the toolheads.

Regardless of the type and permutation of tools attached to toolheads H1 125 and H2 130, an embodiment of the system 100 aligns the center of the toolhead H1 125 with the θ axis 110, such that the bed platform 105 rotates around the center of toolhead H1 125. In this embodiment, toolhead H1 125 remains aligned with the θ axis 110 even as the bed platform 105 is translated along bed X and bed Y axes 115 and 120. In contrast, toolhead H2 130 is mounted to a linear actuator defining an additional radial (R) motion axis 135. In an embodiment, toolhead H1 125 positioned a safe distance away from the R axis 135, such that toolhead H2 130 may be positioned anywhere along the R axis 135 without colliding or interfering with the toolhead H1 125.

As explained in further detail below, the linear motion axes bed X 115, bed Y 120, and R 135 and the rotary axis θ 110 are sufficient to simultaneously and independently position toolheads H1 125 and H2 130 anywhere within the area of the bed platform 105 (with the exception of a small region around the other toolhead). This arrangement is suitable for 2D and 2.5D additive and subtractive manufacturing operations, such as laser or plasma cutting or routing flat panels from planar material stock.

A further embodiment of the automated manufacturing system may optionally mount toolhead H1 125 and/or H2 130 to independent linear actuators to define independent H1 Z and/or H2 Z axes 140 and 145 perpendicular to the bed platform 105, as shown in FIG. 1A. This arrangement is suitable for moving one or both toolheads 125 and 130 anywhere with the three-dimensional volume defined by the limits of the bed and Z axes ranges of motions and can be used for 3D or three-axis additive and subtractive manufacturing processes. Still further embodiments may mount additional motion axes to toolheads H1 and/or H2 125 and 130 to change the angle of the toolheads for four or five-axis manufacturing processes.

The linear motion axes bed X 115, bed Y 120, and R 135 and the rotary axis θ 110 are sufficient to simultaneously and independently position toolheads H1 and H2 anywhere within the area of the bed platform (with the exception of a small region around the other toolhead). With the addition of the H1 and H2 Z axes 140 and 145, these axes are suitable for suitable for moving one or both toolheads anywhere with the three-dimensional volume defined by the limits of the bed platform and Z axes' ranges of motions.

Figure 2A:
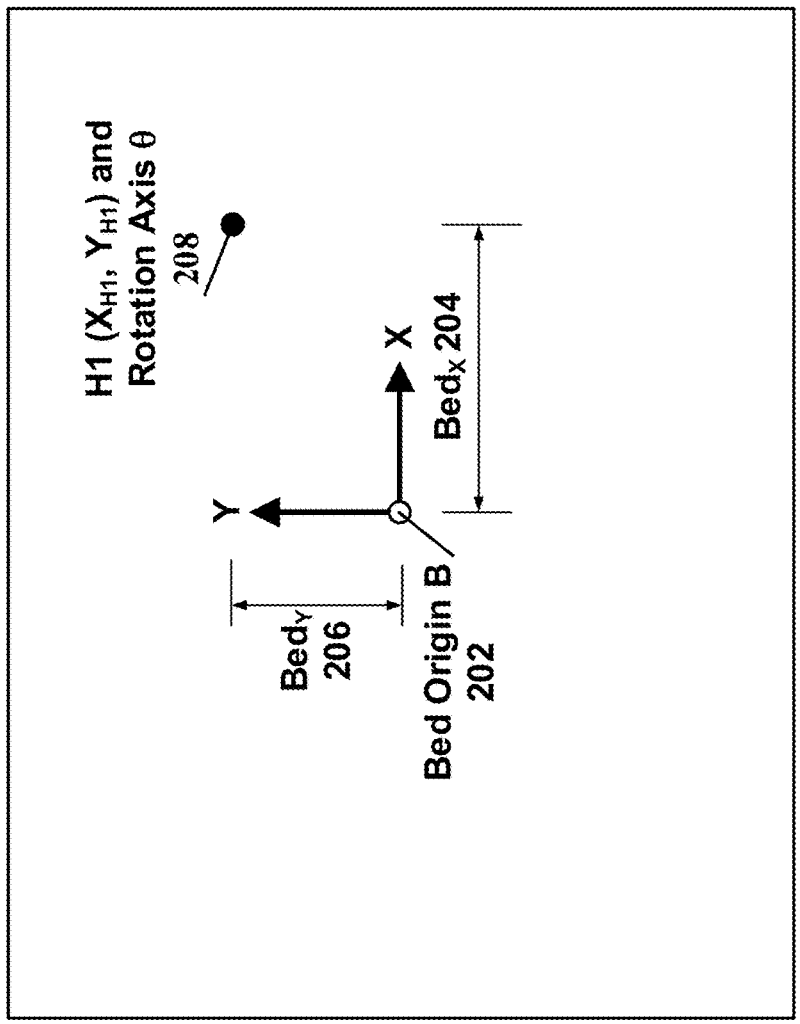
Figure 2B:
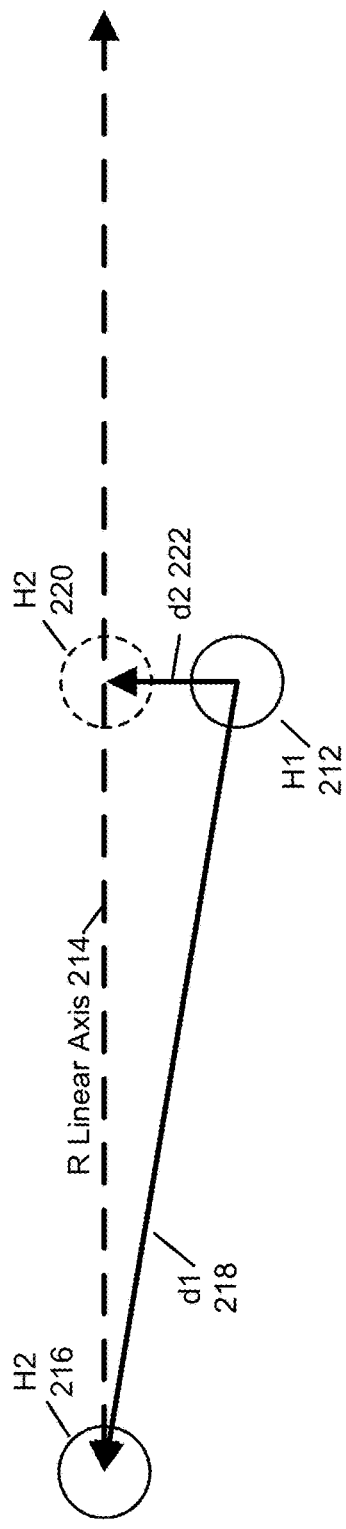
Figure 2D:
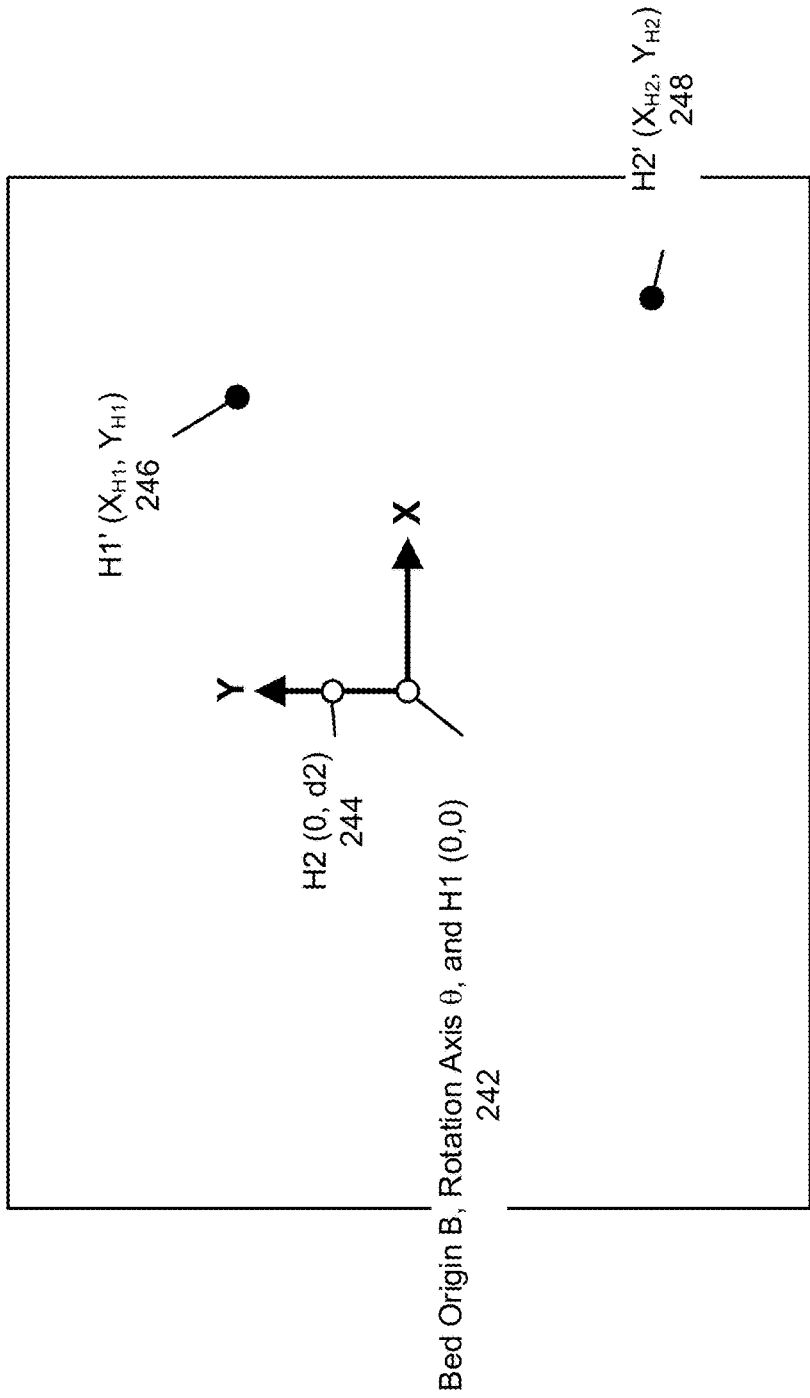
Figure 2E:
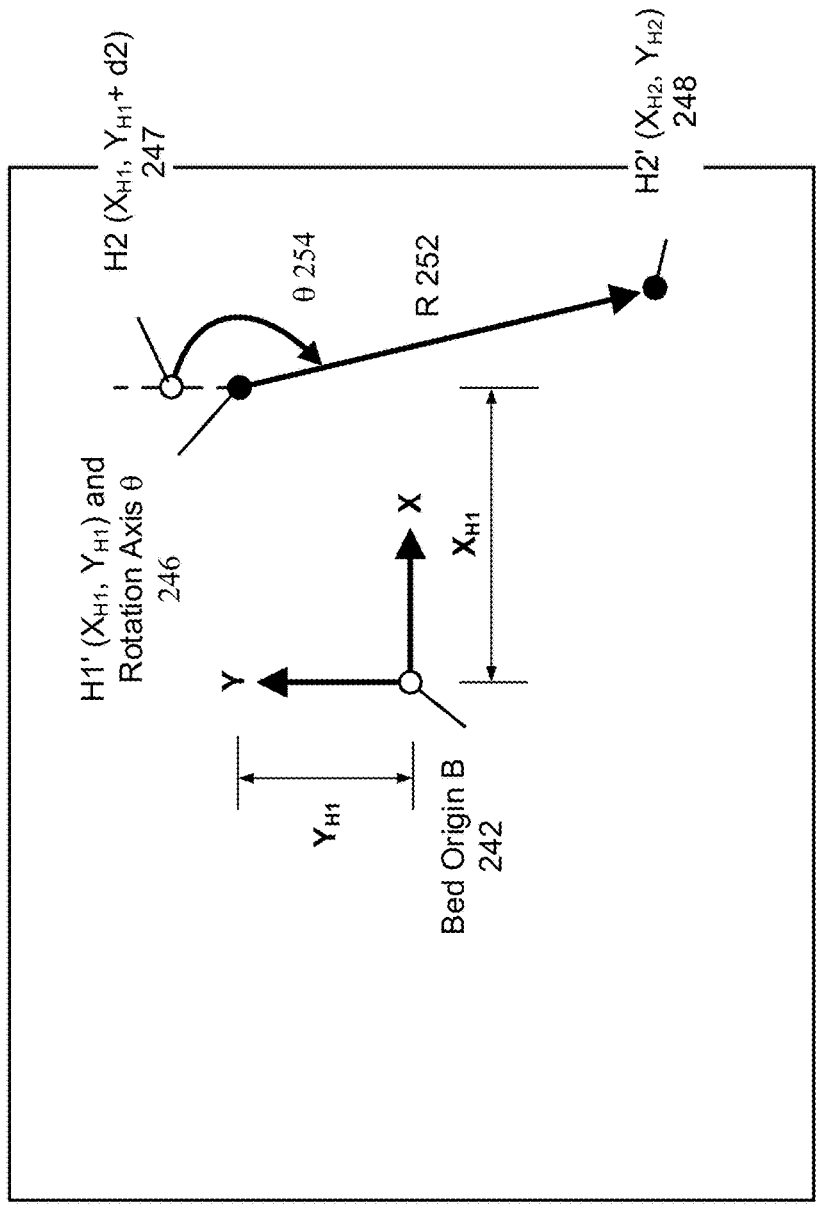

FIGS. 2A-2F illustrate the coordinate transformations from toolhead positions to machine axes and motion ranges of the toolhead in an automated manufacturing system according to an embodiment of the invention. FIG. 2A illustrates an example of how embodiments of the invention may position toolhead H1 using the arrangement of motion axes shown in example system 100. FIGS. 2B and 2C illustrates an example of how embodiments of the invention may position toolhead H2 using the arrangement of motion axes shown in example system 100. FIGS. 2D-2F illustrate how embodiments of the invention may position toolheads H1 and H2 simultaneously and independently using the arrangement of motion axes shown in example system 100.

FIG. 2A illustrates an example positioning 200 of toolhead H1, based on the arrangement of motion axes shown in example system 100. In this example, a bed origin and a bed coordinate system are defined at an arbitrary fixed location and arbitrary orientation with respect to the bed platform. In the example 200 of FIG. 2A, a bed origin 202 is fixed to the center of the surface of the build platform and the bed coordinate axes $Bed_X$ 204, $Bed_Y$ 206, and $Z_1$ are defined as a right-handed coordinate system aligned with the bed platform edges. (In FIGS. 2A-2F, the Z axes and associated Z coordinates of toolheads H1 and H2 are omitted for clarity.)

In this example 200, it is desired to move toolhead H1 to a position 208 ($X_{H1}$, $Y_{H1}$, $Z_{H1}$) in the bed coordinate system. To accomplish this, the bed X and bed Y linear motion axes are used to translate the bed platform by $-X_{H1}$ and $-Y_{H1}$ (if the positive directions on the bed X and bed Y motion axes are defined to match those of bed coordinate system axes).

The following example transformation equation converts a toolhead H1 position in the bed coordinate system to bed X, bed Y, and H1 Z motion axes values:

$$\begin{bmatrix} Bed_X \\ Bed_Y \\ Z_1 \end{bmatrix} = \begin{bmatrix} -1 & 0 & 0 \\ 0 & -1 & 0 \\ 0 & 0 & 1 \end{bmatrix} \begin{bmatrix} X_{H1} \\ Y_{H1} \\ Z_{H1} \end{bmatrix}$$

where ($X_{H1}$, $Y_{H1}$, $Z_{H1}$) are the toolhead H1 coordinates in the bed coordinate system fixed to the bed platform and ($Bed_X$, $Bed_Y$, $Z_1$) are the values of the Bed X, Bed Y, and H1 Z motion axes. Provided that the bed X, bed Y, and H1 Z motion axes are long enough and there is sufficient clearance inside the automated manufacturing system, toolhead H1 can be moved to any arbitrary position in the bed coordinate system.

The Bed X and Bed Y motion axes translate the bed platform to move toolhead H1 to position 208 in the bed coordinate system. As indicated in FIGS. 1A and 1B above, the toolhead H1 remains centered with the θ rotary motion axis, regardless of translation of the bed platform. Thus, θ rotary motion axis is also centered at position 208 in the bed coordinate system following the translation of toolhead H1.

FIGS. 2B-2C illustrate how the R and θ motion axes, as shown in the arrangement of system 100, move toolhead H2 relative to the current position of toolhead H1 to position toolhead H2 anywhere in the bed coordinate system (or any other coordinate system). FIG. 2B illustrates an overhead view 210 of toolheads H1 and H2. As described above, toolhead H1 is mounted in a fixed position 212 relative to the θ motion axis and toolhead H2 is moveable along the linear R axis 214. The motion range of the linear R axis 214 is indicated by the dashed arrow in FIG. 2B. When toolhead H2 is at position 216, toolhead H2 is at a maximum distance from toolhead H1's fixed position 212, which is shown as value d1 218 in FIG. 2B. Similarly, when toolhead H2 is at position 220, toolhead H2 is at the minimum distance from toolhead H1's fixed position 212, which is shown as value d2 222 in FIG. 2B.

It should be noted that toolhead H2 is constrained to the linear R axis 214 and toolhead H1's fixed position 212 does not intersect the linear R axis 214. Provided distance d2 222 is greater than or equal to the minimum clearance required between toolheads H1 and H2, it is physically impossible for the toolheads H1 and H2 to collide or crash into each other.

FIG. 2C illustrates an overhead view 224 of an example working area of toolhead H2. The example working area of toolhead H2 is shown as the shaded area 234 in FIG. 2C. In this illustration, the toolhead H2 can move relative to toolhead H1's fixed position 226 from a minimum distance of d2 228 to a maximum distance of d1 232. Furthermore, because toolhead H1 is aligned with the θ axis, rotating the bed platform around the θ axis is equivalent to rotating the linear R axis around toolhead H1. The combination of linear motion along the R axis and rotation of the bed platform rotation around the θ axis enables toolhead H2 to move anywhere within the shaded area 234 shown in FIG. 2B.

It should be noted that toolhead H2's work area 234 is always defined relative to the current location of toolhead H1. As the bed platform is translated along bed X and bed Y, the position of toolhead H1 relative to the build volume changes. Accordingly, the work area of toolhead H2 also moves relative to the build volume, always being centered around the current position of toolhead H1. Provided that the maximum distance d1 of the R axis is greater than or equal to the maximum possible distance between two points inside the system's allowable build volume, toolhead H2 can be positioned anywhere in the bed coordinate system (except less than distance d2 228 from toolhead H1, shown as the unshaded region 230), regardless of the current position of toolhead H1 in the bed coordinate system. Furthermore, because toolhead H1 typically moves around the bed coordinate system to perform its manufacturing operations, such as subtracting or adding material, toolhead H2 is typically able to access any position in the bed coordinate system eventually.

FIGS. 2D, 2E, and 2F illustrate examples of how the motion axes Bed X, Bed Y, θ, and R operate in concert to independently and simultaneously position toolheads H1 and H2 at arbitrary positions in the build volume. FIG. 2D illustrates an overhead view 240 of toolheads H1 and H2 at initial positions (0, 0) 242 and (0, d2) 244, respectively, in the bed coordinate system. Because toolhead H1 is at bed coordinate position (0, 0) 242, toolhead H1, the bed coordinate origin, and rotation axis θ are all located at position 242, as shown in FIG. 2D.

In this example, it is desired to move toolheads H1 and H2 from their initial positions 242 and 244 to arbitrary target positions H1' ($X_{H1}$, $Y_{H1}$) 246 and H2' ($X_{H2}$, $Y_{H2}$) 248, respectively. To accomplish these toolhead movements, an embodiment of the invention moves the Bed X and Bed Y axes to ($-X_{H1}$, $-Y_{H1}$). FIG. 2E illustrates the results 250 of this motion. In this example, moving the Bed X and Y axes to ($-X_{H1}$, $-Y_{H1}$) translates toolhead H1 and rotation axis θ from initial position 242 to the desired target position H1' ($X_{H1}$, $Y_{H1}$) 246. This movement of the bed axes also translates toolhead H2 from its initial position 244 to the position ($X_{H1}$, $Y_{H1}$+d2) 247. The bed origin remains at position 242.

As shown in FIG. 2E, after the toolhead H1 has been moved to the target position H1' 246 by translating the bed platform along the Bed X and Bed Y axes, the desired toolhead position H2' 248 may be defined by polar coordinates (R, θ), 252 and 254, relative to toolhead H1's current position, H1' 246.

In an embodiment, the values of (R, θ) 252 and 254 in FIGS. 2E and 2F may be determined as follows:

$$R = \sqrt{(Z_{H2} - X_{H1})^2 + (Y_{H2} - Y_{H1})^2}, \text{ and} \qquad 1)$$

$$\theta = \arctan\left(\frac{Y_{H2} - Y_{H1}}{X_{H2} - X_{H1}}\right). \qquad 2)$$

Additionally, if toolhead H2 is to be positioned in three dimensions, then an embodiment of the invention may specify the value of the Z2 motion axis as:

$$Z_2 = Z_{H2}$$

In one embodiment, the R motion axis is collinear with a line passing through the center of toolhead H1. This embodiment may use these values from equations 1) and 2) as the values to be applied to the R and θ motion axes to translate the toolhead H2 along the R motion axis and rotate the bed platform so that toolhead H2 is positioned at the target position H2' ($X_{H2}$, $Y_{H2}$) 248.

In other embodiments of the invention, the R motion axis may not be collinear with a line passing through the center of toolhead H1. For example, FIG. 2B shows an example R motion axis on a line offset by distance d2 from the center of toolhead H1 and the θ motion axis. This also shown in the example of FIGS. 2D-2F, where toolhead H2 has an initial position 244 offset from the θ rotary axis position by distance d2. In these embodiments, the values of R and θ determined in equations 1) and 2) above must be modified to compensate for this R axis offset. If the R motion axis is parallel to the polar axis used to measure angle θ in the relative polar coordinate system, then the modified R' and θ' motion axes values may be defined as follows:

$$R' = \sqrt{R^2 - d2y^2} - d2_x \text{ and} \qquad 3)$$

$$\theta' = \theta - \arcsin\left(\frac{d2_y}{R}\right), \qquad 4)$$

where R and θ are the relative polar coordinate values as described above in equations 1) and 2) above, $d2_x$ and $d2_y$ are the position of toolhead H2 relative to toolhead H1 when toolhead H2 is at its minimum distance from toolhead H1, and the R motion axis has its origin at the position where the toolhead H2 position is at distance d2 from toolhead H1. For any arbitrary toolhead H2 location, this embodiment of the invention first calculates the values of R and θ based on the target H1' ($X_{H1}$, $Y_{H1}$) and H2' ($X_{H2}$, $Y_{H2}$) positions, and then calculates the modified motion axes values R' and θ' using the equations 3) and 4) above based on R, θ, and d2. This embodiment then drives the Bed X, Bed Y, R and θ motion axes to the motion axes values, $Bed_X$, $Bed_Y$, R' and θ', respectively. This results in toolheads H1 and H2 being positioned at locations H1' and H2', respectively.

FIG. 2F illustrates an example 260 of this motion. With the toolhead H2 moved distance R' 262 along the R motion axis and the bed platform rotated by angle θ' 264 around the θ motion axis, the toolhead H2 is positioned at target position H2' ($X_{H2}$, $Y_{H2}$) 248 in the bed platform coordinate system.

As shown in FIG. 2F, because the toolhead H1 is centered around the θ motion axis (both at position 246 in this example), rotating the bed platform around this axis does not change the position of toolhead H1 in the bed coordinate system (i.e. relative to the bed origin and its coordinate axes). Moreover, because embodiments of the invention mount the bed X and bed Y linear motion axes to the θ rotational axis, rotating the bed platform does not change the directions of these motion axes relative to the bed coordinate system.

Although the motions shown in FIGS. 2E and 2F are shown separately for clarity, embodiments of the invention may move the Bed X, Bed Y, θ, and R motion axes simultaneously to move toolheads H1 and H2 in parallel to any target positions H1' 246 and H2' 248.

Figure 6:
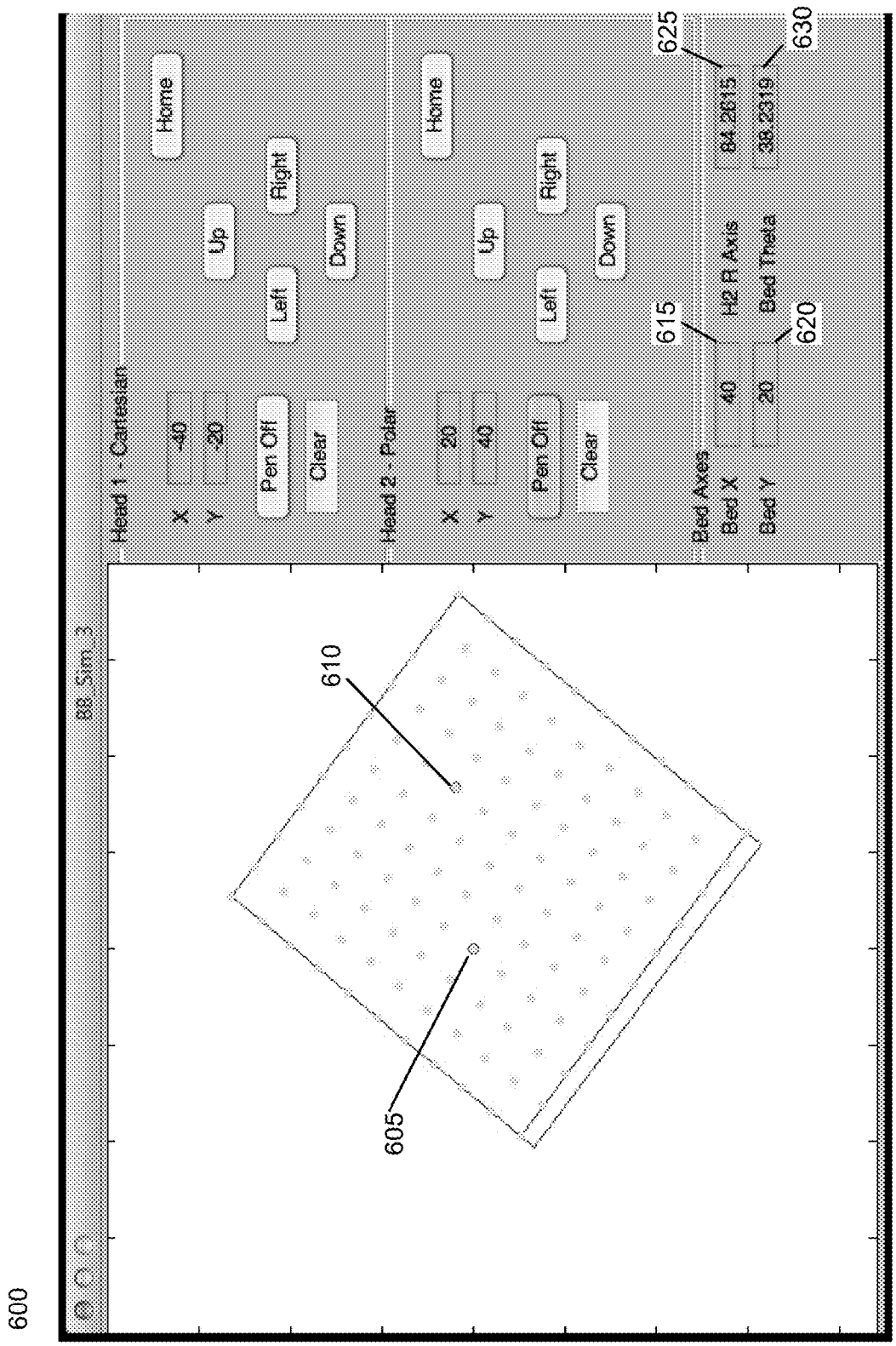
FIG. 6 illustrates a screenshot of a motion simulation of an automated manufacturing system according to an embodiment of the invention.

An attached program listing and graphical user interface screenshot 600 in FIG. 6 illustrate a simulation of the motion of toolheads H1 and H2 and the associated coordinate transformations according to an embodiment of the invention. The example screenshot 600 shown in FIG. 6 positions toolheads H1 and H2 at target positions (−40, −20) 605 and (20, 40) 610 in the bed coordinate system, respectively. Toolhead H1 and the bed θ axis are fixed in this example at the global or system coordinates of (0, 0). Toolhead H2 is constrained to a linear R axis that is a horizontal line offset by d2=10 from toolhead H1. Using these desired target toolhead positions and the example system configuration, the bed X 615, bed Y 620, toolhead H2 R axis 625, and bed θ axis 630 have the following values, respectively: 40, 20, 84.26, and 38.23 degrees, as shown in FIG. 6. As can be seen by comparing the toolhead positions with the grid points attached to the bed platform in this figure, these motion axes values position toolheads H1 and H2 at their desired target positions. It can also be seen in this figure that the toolhead H1 remains at a fixed location with respect to the system or global coordinate frame and aligned with the bed platform axis of rotation.

As shown in FIGS. 2A-2F, toolheads H1 and H2 can each independently and simultaneously move to any arbitrary position within the build volume (with the exception of a small region around the other toolhead) without colliding or interfering with the operation of the other toolhead. The position of toolhead H1 is controlled by the bed X, bed Y, and H1 Z axes and the position of toolhead H2 is controlled by the R, θ, and H2 Z axes.

Embodiments of the automated manufacturing system may be controlled by numerical control programs. Numerical control programs may specify one or more sequences of toolhead positions, motion paths, and motion parameters, as well as other manufacturing parameters such as material deposition rates, cutting spindle speeds, positions or orientations of optional additional motion axes, tool selections, or other toolhead-specific parameters. Numerical control programs may be expressed in any data or program format, including numerical control programming languages such as g-code (RS-274 or ISO 6983) or any of its variants and STEP-NC. Embodiments of the invention may utilize numerical control programs created manually or using any type of CAM software known in the art, including 3D printer slicers or mill tool path generators. Because embodiments of the invention utilize two toolheads moving simultaneously and independently, embodiments of the invention may execute separate numerical control programs for each toolhead in parallel or a single numerical control program specifying the motion and operation of both toolheads.

Numerical control programs may express toolhead positions in terms of one or more bed coordinate systems, and embodiments of the invention may transform these bed coordinate positions into corresponding values Bed X, Bed Y, R and θ motion axes, for example using the equations described above or similar transformations, as the numerical control programs are being executed. Alternatively, CAM or other software tools may generate numerical control programs expressed directly in terms of Bed X, Bed Y, R and θ motion axes values.

Because toolhead H2 can never get closer than distance d2 to toolhead H1, embodiments of the invention may monitor the positions of toolheads H1 and H2 to ensure that toolhead H2 does not try to move to a position when toolhead H1 is less than distance d2 from that position. One embodiment of the invention computes the value of the R axis for any desired toolhead H2 based on the current toolhead H1 position. If the value of the R axis is less than d2, this embodiment of the invention pauses the motion of toolhead H2 until toolhead H1 has moved more than distance d2 from the desired toolhead H2 position. At this point, this embodiment resumes the operation of toolhead H2. If toolhead H1 is idle, a further embodiment of the invention may move toolhead H1 to a new position more than distance d2 from the desired toolhead H2 position so that toolhead H2 can complete the desired movement.

In still other embodiments of the invention, if both toolheads have multiple motion paths within distance d2 of each other, these embodiments may alternate execution of each toolhead's motion paths, forcing the other toolhead to be idle and moving it more than distance d2 from the other toolhead's motion paths.

Figure 3:
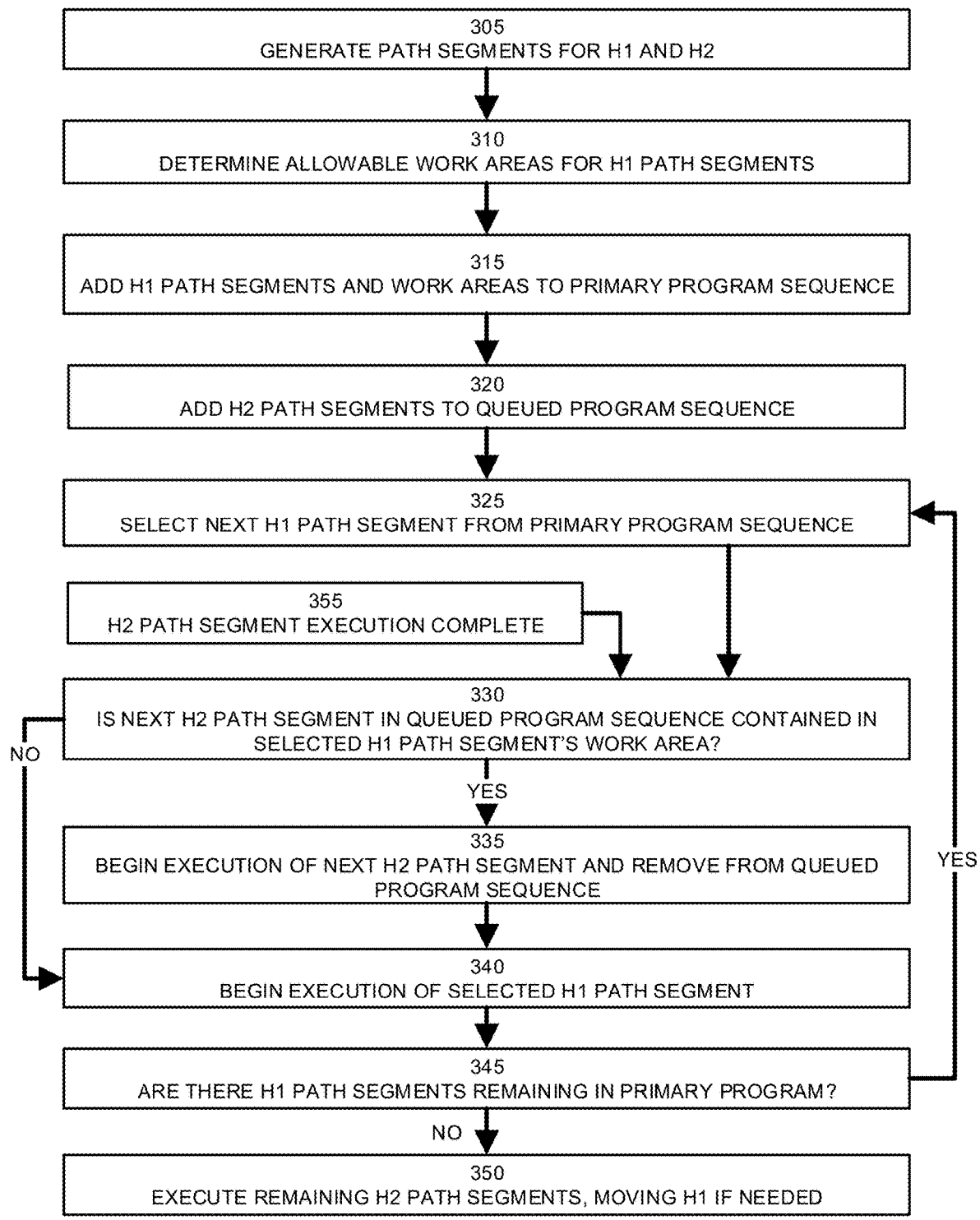
FIG. 3 illustrates a method of generating and processing toolhead path commands to operate two toolheads independently and simultaneously in an automated manufacturing system according to an embodiment of the invention.

FIG. 3 illustrates yet another method 300 of generating and processing toolhead path commands to operate two toolheads independently and simultaneously in an automated manufacturing system according to an embodiment of the invention. This embodiment queues toolhead moves until they can be completed without pausing due to the position of the other toolhead. Additionally, this embodiment may be extended to allow scheduling and execution of operations on one toolhead that are dependent on the completion of operations from the other toolhead.

Step 305 generates path segments for toolheads H1 and H2. Step 305 may use any type of CAM or other motion path generation technique known in the art to create motion paths for toolheads H1 and H2. In an embodiment, a motion path segment is a portion of the toolhead's desired motion path needed to create a part. Each motion path segment may correspond with a single numerical control command or program statement or other convenient partitioning of a toolhead's overall motion path.

For each motion path segment for toolhead H1, step 310 determines the allowable work area for toolhead H2. In an embodiment, step 310 computes a bounding box enclosing the toolhead H1 motion path segment. In this embodiment, step 310 then determines the Minkowski sum of this bounding box and the excluded area around toolhead H1, such as a circle with radius d2 as shown in FIG. 2C. This resulting shape is subtracted from the entire build area/volume to determine the allowable work area for toolhead H2 while toolhead H1 moves through this motion segment.

The Minkowski sum of the toolhead motion path segment bounding box and the excluded area is conservatively oversized, leading to a conservatively undersized allowable work area. However, this computation is convenient and relatively simple to evaluate. Additional embodiments of the invention may use tighter enclosing hulls of the motion path segment instead of a simple bounding box for the Minkowski sum or compute the Minkowski sum of the motion path segment itself and the excluded area to determine better (i.e. larger) allowable work areas for each toolhead H1 motion path. Still further embodiments may sweep a shape representing the excluded area along the toolhead H1 motion path segment or an enclosing hull of this motion path segment.

Step 315 adds the toolhead motion path segments and associated allowable work areas to a primary numerical control program sequence. In an embodiment, the numerical control command(s) or program statement(s) corresponding with the motion path segment are added to a numerical control program along with their associated allowable work areas. The allowable work areas may be represented in the numerical control program by metadata (for example embedded as comments or other data structures), additional numerical control commands or other program statements, or using any other type of data structure or control program commands.

Step 320 adds the toolhead H2 motion path segments in sequence to a queued program sequence. The queued program sequence may be implemented as a separate numerical control program, numerical control commands or program statements embedded or otherwise integrated with the primary program sequence, or using any other type of data structure or control program commands.

Steps 325-450 are performed by the automated manufacturing system during the execution of the numerical control program(s). Step 325 selects the next toolhead H1 motion path segment from the primary program sequence and its allowable work area. During the first iteration through this method step, step 325 selects the first H1 motion path segment in the primary program sequence.

Step 330 selects the next H2 motion path segment in the queued program sequence and determines if this motion path segment is wholly contained in the allowable work area for the selected H1 motion path segment. If the next H2 motion path segment is not wholly contained in the allowable work area for the H1 motion path segment, method 300 proceeds directly to step 340. Alternatively, if the next H2 motion path segment is wholly contained in the allowable work area for the H1 motion path segment, then step 335 begins execution of this H2 motion path segment and removes it from the queued program sequence.

Following either step 335 or 330, step 340 begins execution of the selected H1 motion path segment. In a further embodiment, step 340 may determine if the current position of toolhead H2 is within the allowable work area of the current H1 motion path segment. If not, then this further embodiment of step 340 may move toolhead H2 to a new position within the allowable work area of the selected H1 motion path prior to beginning the execution of this motion path. Alternatively, step 340 may be omitted and the current H1 motion path segment may begin execution at the time of its selection in step 325.

Step 345 determines if there are any H1 motion paths remaining to be executed in the primary program sequence. If so, then method 300 returns to step 325 and repeats steps 325-345. Otherwise, method 300 proceeds to step 350. Step 350 determines if there are any H2 motion path segments in the queued program sequence that have not been executed. If so, step 350 executes these motion path segments in sequence. In a further embodiment, step 350 moves toolhead H1 to a safe location during this execution of the remaining H2 motion path segments. For example, an embodiment of step 350 may retract toolhead H1 above the height of the current part being created and moved to any position at distance d2 or greater from a bounding box of one or more of the remaining H2 motion path segments.

In an embodiment, if the H2 motion path segment completes execution before the execution of the corresponding H1 motion path segment, the H2 toolhead may pause until the H1 motion path segment completes its execution. Alternatively, an interrupt step 355 may be triggered by the completion of the H2 motion path segment, allowing step 330 to evaluate the next H2 motion path segment in the queued program sequence.

Although omitted for clarity from FIG. 3, embodiments of method 300 may behave similarly if the H1 motion path segment completes execution prior to the completion of H2 motion path segment by either pausing the toolhead H1 or executing the next H1 motion path segment in the primary program sequence.

In a further embodiment, step 305 estimates the time toolheads H1 and H2 require to complete each motion path segment. Steps 315 and 320 store this time information with their associated the motion path segments for future reference. Step 330 uses this time information to "look-ahead" and determine if the next queued H2 motion path segment can be executed within the time estimated for the selected H1 motion path segment. If not, then step 330 determines if the next queued H2 motion path segment is contained within the allowable work areas for the selected H1 motion path segment and one or more subsequent H1 motion path segments. The number of H1 motion path segments used for looking-ahead is determined by summing the H1 motion path segment time for two or more H1 motion path segments and determining when this sum is greater than or equal to the H2 motion path segment time.

In some applications, the manufacturing operations of toolheads H1 and H2 may be interdependent. For example, toolhead H1 may be an additive manufacturing toolhead depositing plastic or metal material in a coarse shape and toolhead H2 may be a subtractive manufacturing toolhead, such as a mill, that removes excess material from the coarse shape to produce a refined part shape. In these applications, toolhead H1 must complete its additive motion path before toolhead H2 executes the corresponding subtractive motion path segment.

For these applications, an additional embodiment of the invention may include a sequence number, an identifier, or other identifying metadata identifying each motion path segment in the primary and queued program sequences. This embodiment of the invention may also provide some or all of the motion path segment with the identifiers for any corresponding motion path segments. This embodiment of the invention may inhibit the execution of a toolhead motion path segment if the corresponding motion path segment for the other toolhead has not been executed yet. In another implementation of this embodiment, breakpoints with identifiers may be inserted into the primary and/or queued program sequences to pause program sequence execution until a motion path segment with the corresponding identifier is executed by the other toolhead. To prevent blocking conditions, this embodiment may permit the paused toolhead to move out of the way of the other toolhead if necessary, for example by executing numerical control commands or program statements that are designated as non-blockable.

Figure 4:
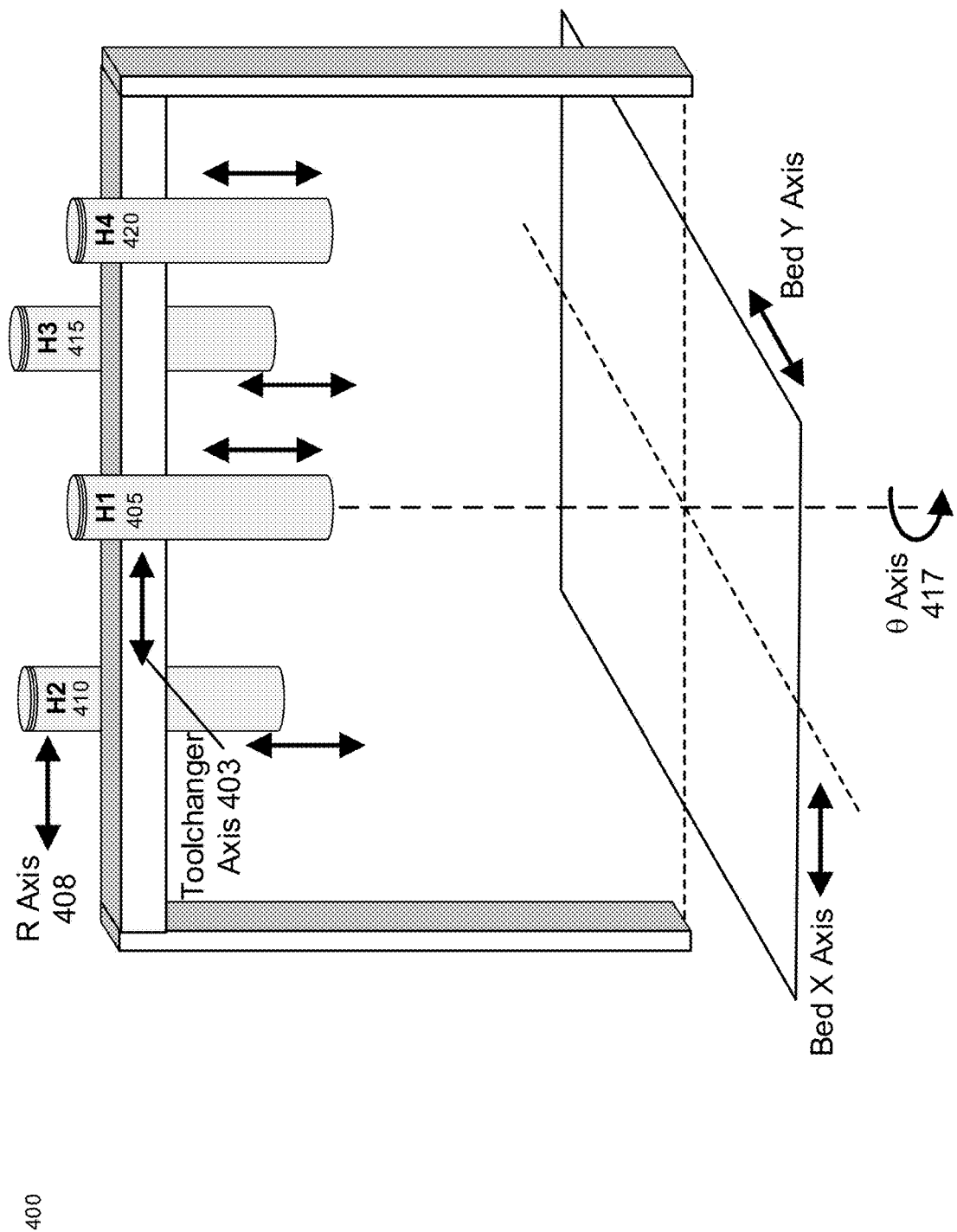
FIG. 4 illustrates an additional automated manufacturing system including three or more toolheads according an embodiment of the invention.

FIG. 4 illustrates an additional automated manufacturing system 400 including three or more toolheads according an embodiment of the invention. As described above, embodiments of the invention enable the simultaneous and independent operation of two toolheads over the entire build volume. FIG. 4 extends these embodiments by including three or more toolheads, with the ability to operate different combinations of toolheads at different times. For example, linear motion axis R 408 includes toolheads H2 410 and H3 415, each with optional independent Z axes. In this example, the automated manufacturing system can operate either toolhead H2 410 or H3 415, with the idle toolhead moving to a holding position on the R axis 408 that is outside the other toolhead's range of motion. This example uses the linear motion axis R 408 and the θ rotational axis 417 to position the active toolhead at any position in the build volume.

Similarly, this example automated manufacturing system 400 may include toolheads H1 405 and H4 420, each with optional independent Z axes. In this example, the automated manufacturing system can operate either toolhead H1 405 or H4 420, with the other toolhead being idle. In one embodiment, a toolchanger mechanism moves the active toolhead to a position aligning the center of the active toolhead with the θ motion axis. One implementation of the toolchanger mechanism is simply another linear axis 403, similar to the R axis 408, that can move toolheads H1 405 and H4 420.

In another implementation, the toolheads H1 405 and H4 420 are fixed with respect to the θ motion axis 417. In this implementation, the bed X, bed Y, θ, and R motion axes are used in concert to position the H4 420 toolhead (or any other fixed toolhead that is not aligned with the θ motion axis 417) anywhere within the build volume. This may be done by solving a system of equations representing the positions of the active toolheads in terms of the bed X, bed Y, θ, and R motion axes, where both toolheads are offset from the θ motion axis 417. For example, this may be a set of four non-linear equations defining the bed X, bed Y, θ, and R motion axis values in terms of the toolhead positions and their offsets from the θ motion axis. Regardless of the implementation, embodiments of the invention may the fix the horizontal location (e.g. excepting the toolhead's Z axis) of one of the toolheads relative to the θ motion axis 417 while that toolhead is active.

Figure 5:
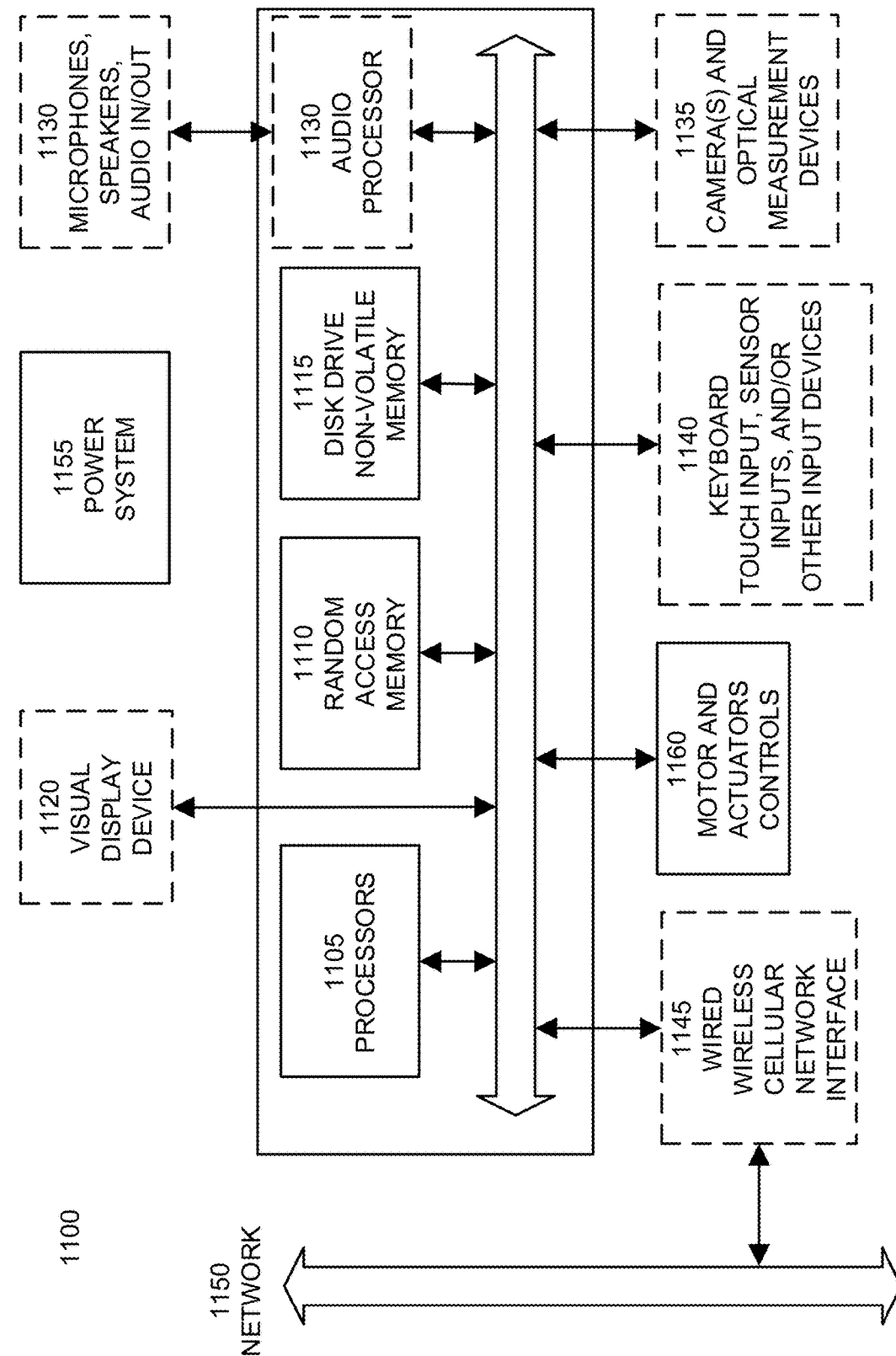
FIG. 5 illustrates a computer system suitable for controlling an automated manufacturing system including two independently and simultaneously operating toolheads according an embodiment of the invention.

FIG. 5 illustrates a computer system suitable for controlling an automated manufacturing system including two independently and simultaneously operating toolheads according an embodiment of the invention. The computer system 1100 includes one or more general purpose or specialized processors 1105, which can include microprocessors, microcontrollers, system on a chip (SoC) devices, digital signal processors, graphics processing units (GPUs), ASICs, and other information processing devices. The computer system 1100 also includes random access memory 1110 and non-volatile memory 1115, such as a magnetic or optical disk drive and/or flash memory devices.

The computer system 1100 may optionally includes one or more visual display devices 1120. The computer system 1100 may also optionally include an audio processor 1125 for generating and receiving sound via speakers, microphone, or other audio inputs and outputs 1130; and optional sensors and input devices 1140 such as keyboards; scroll wheels; buttons; keypads; touch pads, touch screens, and other touch sensors; joysticks and direction pads; motion sensors, such as accelerometers and gyroscopes; global positioning system (GPS) and other location determining sensors; temperature sensors; mechanical, optical, magnetic or other types of position or angle detectors and/or limit switches for detecting the current positions of the various components of the above-described systems; voltage, current, resistance, capacitance, inductance, continuity, or any other type of sensor for measuring electrical characteristics of the various components of the above-described systems; force, acceleration, stress or strain, and/or tension sensors; and/or any other type of input device known in the art. Computer system 1100 may optionally include one or more cameras or other optical measurement devices 1135 for capturing still images and/or video.

The computer system 1100 may also include one or more modems and/or wired or wireless network interfaces 1145 (such as the 802.11 family of network standards) for communicating data via local-area networks 1150; wide-area networks such as the Internet; CDMA, GSM, or other cellular data networks of any generation or protocol; industrial networks; or any other standard or proprietary networks. The computer system 1100 can also include a peripheral and/or data transfer interface, such as wired or wireless USB, IEEE 1394 (Firewire), Bluetooth, or other wired or wireless data transfer interfaces.

The computer system 1100 can include a power system 1155 for obtaining electrical power from an external source, such as AC line current or DC power tailored to the computer system 1100 via an external power supply, as well as one or more rechargeable or one-time use batteries, fuel cells, or any other electrical energy generation device. Additionally, power system 1155 may provide energy in the form of compressed gas, vacuum, and/or hydraulic systems to power various actuators and components of embodiments of the invention.

Computer system 1100 may be implemented in a variety of different form factors, including desktop and laptop configurations as well as embedded and headless forms.

Embodiments of the invention use a variety of linear and rotary motors and actuators, such as brushed or brushless DC motors; AC synchronous and induction motors; stepper motors; servomotors; solenoids; leadscrews, ballscrews, or other mechanical devices for creating linear motion; and/or pneumatic and hydraulic actuators. In an embodiment, computer system 1100 include motor and actuator controls 1060 for providing power and control signals to these motors and actuators.

Further embodiments can be envisioned to one of ordinary skill in the art. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of generating a numerical control program for an automated manufacturing system, the method comprising:
   selecting a subtractive motion path segment instruction representing a subtractive motion path assigned to a subtractive toolhead;
   identifying an additive motion path segment instruction representing an additive motion path assigned to an additive toolhead, wherein the additive motion path segment instruction must be completed prior to executing the selected subtractive motion path segment instruction;
   inhibiting the execution of the subtractive motion path segment instruction until execution of the additive motion path segment instruction is complete; and
   enabling the execution of the subtractive motion path segment instruction following the execution of the additive motion path segment instruction;
   wherein inhibiting the execution of the subtractive motion path segment instruction until the execution of the additive motion path segment instruction is complete comprises:
   determining a subtractive instruction execution time period corresponding with the subtractive motion path segment instruction;
   identifying a second additive motion path segment instruction to be executed in parallel with the subtractive motion path segment instruction;
   determining an additive instruction allowable work area and additive instruction execution time period corresponding with the second additive motion path segment instruction;
   determining if the subtractive instruction execution time period is greater than the additive instruction execution time period;

in response to the determination that the subtractive instruction execution time period is not greater than the additive instruction execution time period, inhibiting the execution of the subtractive motion path segment instruction if its corresponding subtractive motion path segment is not contained in the additive instruction allowable work area; and in response to the determination that the subtractive instruction execution time period is greater than the additive instruction execution time period;
   identifying a third additive motion path segment instruction following the second additive motion path segment instruction;
   determining an additional additive instruction allowable work area corresponding with the third additive motion path segment instruction; and
   inhibiting the execution of the subtractive motion path segment instruction if its corresponding subtractive motion path segment is not contained in the additive instruction allowable work area and the additional additive instruction allowable work area.

2. The method of claim 1, wherein identifying the additive motion path segment instruction comprises:
   accessing metadata associated with the subtractive motion path segment instruction to identify the additive motion path segment instruction.

3. The method of claim 2, wherein the metadata includes identifying metadata identifying the additive motion path segment instruction.

4. The method of claim 2, wherein the metadata includes an enclosing hull of the subtractive motion path segment.

5. The method of claim 1, wherein inhibiting the execution of the subtractive motion path segment instruction comprises:
   inserting a breakpoint into the numerical control program to inhibit the execution of the subtractive motion path segment instruction until the additive motion path segment instruction is complete.

6. The method of claim 1, wherein enabling the execution of the subtractive motion path comprises:
   adding the selected subtractive motion path segment instruction to a queued program sequence.

7. The method of claim 6, wherein the queued program sequence is embedded in a primary program sequence.

8. The method of claim 6, wherein the queued program sequence is a separate program sequence.

9. The method of claim 1, wherein the subtractive toolhead includes a laser cutter.

10. The method of claim 1, wherein the subtractive toolhead includes a mill.

11. A method of generating a numerical control program for an automated manufacturing system, the method comprising:
   selecting an additive motion path segment instruction representing an additive motion path assigned to an additive toolhead;
   identifying a subtractive motion path segment instruction representing a subtractive motion path assigned to a subtractive toolhead, wherein the selected additive motion path segment instruction must be completed prior to executing the identified subtractive motion path segment;
   inhibiting the execution of the subtractive motion path segment instruction until execution of the additive motion path segment instruction is complete; and
   enabling the execution of the subtractive motion path segment instruction following the completion of the additive motion path segment instruction;
   wherein enabling execution of the subtractive motion path comprises:
   adding the selected subtractive motion path segment instruction to a queued program sequence; and
   wherein inhibiting the execution of the subtractive motion path segment instruction until the execution of the additive motion path segment instruction is complete comprises:
   determining a subtractive instruction execution time period corresponding with the subtractive motion path segment instruction;
   identifying a second additive motion path segment instruction to be executed in parallel with the subtractive motion path segment instruction;
   determining an additive instruction allowable work area and additive instruction execution time period corresponding with the second additive motion path segment instruction;
   determining if the subtractive instruction execution time period is greater than the additive instruction execution time period;
   in response to the determination that the subtractive instruction execution time period is not greater than the additive instruction execution time period, inhibiting the execution of the subtractive motion path segment instruction if its corresponding subtractive motion path segment is not contained in the additive instruction allowable work area; and
   in response to the determination that the subtractive instruction execution time period is greater than the additive instruction execution time period;
      identifying a third additive motion path segment instruction following the second additive motion path segment instruction;
      determining an additional additive instruction allowable work area corresponding with the third additive motion path segment instruction; and
   inhibiting the execution of the subtractive motion path segment instruction if its corresponding subtractive motion path segment is not contained in the additive instruction allowable work area and the additional additive instruction allowable work area.

12. The method of claim 11, wherein identifying the subtractive motion path segment instruction comprises:
   accessing metadata associated with the additive motion path segment instruction to identify the subtractive motion path segment instruction.

13. The method of claim 12, wherein the metadata includes identifying metadata identifying the subtractive motion path segment instruction.

14. The method of claim 12, wherein the metadata includes an enclosing hull of the additive motion path segment.

15. The method of claim 11, wherein inhibiting the execution of the subtractive motion path segment instruction comprises:
   inserting a breakpoint into the numerical control program to inhibit the execution of the subtractive motion path segment instruction until the additive motion path segment instruction is complete.

16. The method of claim 11, wherein the queued program sequence is embedded in a primary program sequence.

17. The method of claim 11, wherein the subtractive toolhead includes a laser cutter.

\* \* \* \* \*